United States Patent Office 3,248,284

Patented Apr. 26, 1966

3,248,284

METHOD FOR CONTROL OF POWDERY MILDEW

Thomas E. Deger, Ambler, Pa., assignor to Pennsalt Chemicals Corporation, Philadelphia, Pa., a corporation of Pennsylvania No Drawing. Filed June 30, 1964, Ser. No. 379,362
2 Claims. (Cl. 167—31)

This invention relates to a method for the control of powdery mildew and to compositions which provide excellent powdery mildew control. More particularly, the invention is concerned with the use of bis(tert-alkylphenol) disulfides as active agents for control of powdery mildew.

Powdery mildew is a fungus which causes numerous diseases on fruits, vegetables, berries, flowers, tobacco, grasses and cereals, and such diseases are responsible for large economic losses in the agricultural field. Powdery mildew of roses, strawberries, peaches, peas, clover, grasses and cereals is caused by the mildew of the erysiphaceae family. Powdery mildews of apples, cherries and other fruits is caused by species in the perisporiaceae family. Other examples of the wide variety of powdery mildew diseases are indicated at pages 583 and 586 of the text by Heald, "Manual of Plant Diseases," 1933, McGraw-Hill Book Company, Inc. The casual organisms of powdery mildew belong to several genera of fungi having a morphological and physiological similarity in that they possess mycelium and fruiting structures which are resistant to desiccation and which can exist on the plant leaf or stem. The group is quite resistant to most organic fungicides presumably because of this marked difference from other fungi which live internally in the host tissue.

Heretofore, powdery mildew has been treated by numerous techniques, but none of them is entirely satisfactory. Lime-sulfur mixtures are often effective, but are limited in their use to well-pruned, well-cared for orchards because of possible phytotoxic effects on foliage. Other commercial, agricultural fungicides, such as the zinc and iron salts of dimethyldithiocarbamic acid, the zinc and manganese salts of ethylene bisdithiocarbamic acid (Zineb and Maneb) are not as effective as lime-sulfur, and 4,6-dinitro-2-caprylphenyl crotonate (Karathane) has a limited range of safety to plant foliage. Thus, although some of these known fungicides show activity against powdery mildew, they are limited either in effectiveness or safety to plant foliage.

It has now been found, in accord with this invention, that powdery mildew may be controlled effectively and economically by using as the active agent a bis(tert-alkylphenol) disulfide. More particularly, the active agents employed in this invention have the structure:

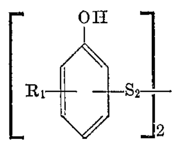

where $R_1$ is a tertiary alkyl group containing from four to six carbon atoms and is preferably a tertiary amyl group. Further, in accord with this invention, control of powdery mildew on plants may be obtained by treating said plants with a composition comprising a carrier and a powdery mildew controlling amount of the bis(tert-alkylphenol) disulfide described above.

The active agents useful in this invention are known compounds readily prepared by reacting sulfur monochloride with an alkylphenol in the presence or absence of a solvent. It will be understood that the alkyl and sulfur substituents may be of ortho, meta, or para to the phenolic hydroxyl group.

The procedures which will be used for applying the fungicidal composition to the plants will be in accord with usual practices. Since the active compound has limited water solubility, the active compounds will usually be applied to the plants as an aqueous dispersion which is preferably obtained from a wettable powder. In a preferred embodiment of the invention, the concentrate of the active agent together with a carrier and containing a surfactant will be manufactured and sold as an article of commerce. Preferably, this concentrate will be in the form of a wettable powder, made simply by blending the active agent with a carrier, such as a clay or other finely divided or particulate inert matter, e.g., attapulgite, bentonite, vermiculite, and the like. As a surfactant, there may be used one or more of the many surface active agents generally employed, such as a polyalkylene oxide, a ligninsulfonate, or the various other cationic, anionic and nonionic surfactants available for such purposes. Generally, the wettable powder concentrate will contain from about 5 to about 90% by weight of an active agent, the balance being the carrier and surfactant.

Alternatively, the active agents may be formulated in organic solvent systems as a solution or emulsion concentrate containing from 5 to 90% by weight of active agent and the organic solvent system dispersed in water just prior to use. Generally, the organic material will be an aromatic hydrocarbon solvent, such as xylene, toluene, etc., but other solvent systems such as ketones (methyl ethyl ketone, acetone, etc.), aliphatic amides, such as dimethylformamide, dimethylacetamide, ketoalcohols (diacetone alcohol) and the like, may also be used.

The rate of application of the fungicides onto the plant, flower or crop to be treated will vary between about 0.65 to 10 pounds per acre of active material. Preferably, and for economic reasons, the rate of application will be from 0.1 to 5.0 pounds per acre or from 0.5 to 2 lbs. per gallon for tree applications. Application is made in the usual manner by spraying an aqueous dispersion of the agent onto the plant and treatment in this manner enables control of powdery mildew to be obtained.

In order to more fully illustrate the invention, the following examples are given.

*Example 1.—Formulations useful*

A. *Wettable powder.*—

| | Percent by weight |
|---|---|
| Bis(tert-butylphenol) disulfide | 50 |
| Surfactants: | |
| Sodium lignosulfonate ("Marasperse" N) | 2 |
| Alkylphenoxypoly(ethyleneoxy)ethanol ("Igepal" RC-760) | 2 |
| Carrier: | |
| Attapulgite ("Attaclay") | 46 |

B. *Aqueous ball milled disperson.*—Ten parts by weight of bis(tert-amylphenol) disulfide and 90 parts by weight of water are ball milled in the presence of an alkyl urea polyether alcohol surfactant until a stable dispersion is obtained.

*Example 2.—Evaluation of agents*

The active agents were evaluated by spraying snap (green) bean plants in pots with a water dispersion containing 25% by weight of active agent, the spraying being done to provide various known rates of application to the plant. Subsequent to the spray treatment, plants were inoculated with cultures of powdery mildew (*Erysiphe polygoni*). The treated plants were inspected after two weeks and the area of infected leaves was determined and kill of the fungi expressed as percentage of the control which was usually 95% to 100% infected.

Using the above testing procedures, bis(p-tert-amylphenol) disulfide was applied to infected plants at rates of 1.25, 2.5 and 5.0 pounds per acre and 98% to 100% control of powdery mildew was obtained. In like manner, bis(o-tert-butylphenol) disulfide and bis(p-tert-hexylphenol) disulfide give excellent control of powdery mildew infections on plants.

It will be understood that numerous variations and modifications may be made from the description and examples given above without departing from the spirit and scope of the invention.

I claim:

1. A method for controlling powdery mildew on plants, which comprises applying to said plants a powdery mildew controlling amount of bis(tert-alkylphenol) disulfide wherein said alkyl group contains from four to six carbon atoms.

2. A method for the control of powdery mildew on plants which comprises treating said plants with an amount of bis(p-tert-amylphenol) disulfide ranging from 0.10 to 5.0 pounds per acre.

References Cited by the Examiner

UNITED STATES PATENTS

| | | | |
|---|---|---|---|
| 2,174,248 | 9/1939 | Mikeska et al. | 87—9 |
| 2,209,463 | 7/1940 | Lieber et al. | 23—250 |
| 2,299,213 | 10/1942 | Cook et al. | 260—609 |
| 2,346,826 | 4/1944 | Cook et al. | 260—609 |
| 2,459,063 | 1/1949 | Cook et al. | 260—429 |
| 2,560,421 | 7/1951 | Eby | 260—608 |
| 2,723,910 | 11/1955 | Goodhue et al. | 71—217 |
| 2,937,208 | 5/1960 | Retter et al. | 260—608 |
| 2,962,417 | 11/1960 | Harris | 167—30 |
| 3,141,045 | 7/1964 | Aichennegg et al. | 260—608 |

FOREIGN PATENTS

| | | |
|---|---|---|
| 262,191 | 6/1949 | Switzerland. |

LEWIS GOTTS, *Primary Examiner.*